May 22, 1951 W. F. GRIMES 2,554,328
SEALING TUBE AND METHOD OF SEALING
Filed June 16, 1947
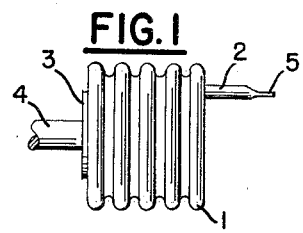
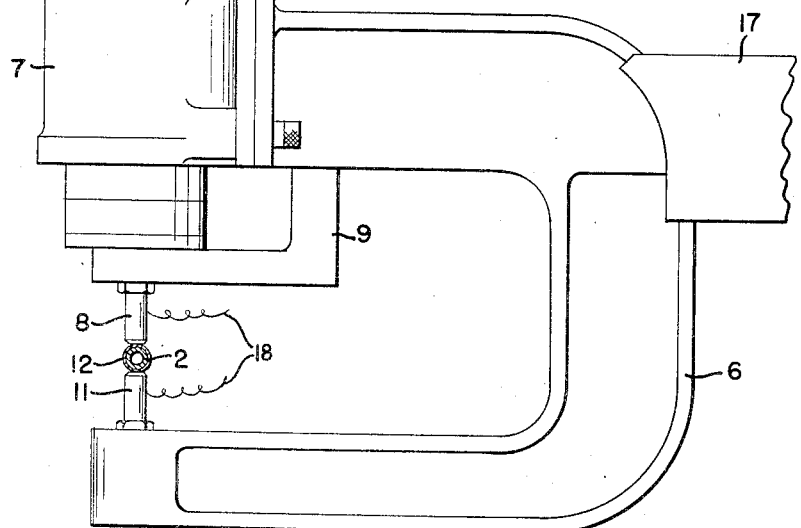
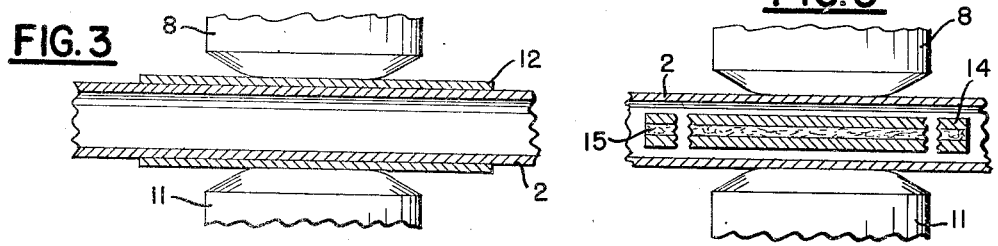
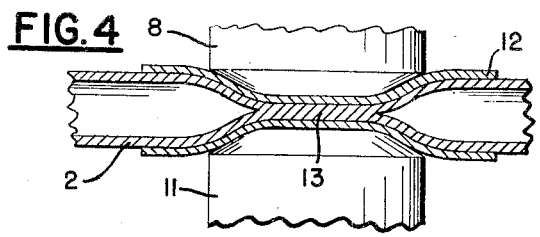
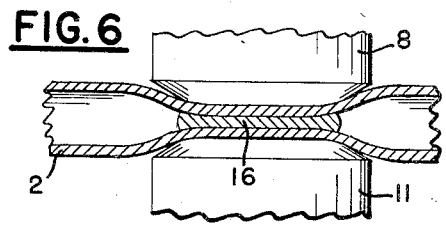
INVENTOR
WILLIAM F. GRIMES
BY
Toulmin & Toulmin
ATTORNEYS Patented May 22, 1951

2,554,328

UNITED STATES PATENT OFFICE 2,554,328

SEALING TUBE AND METHOD OF SEALING

William F. Grimes, Dayton, Ohio

Application June 16, 1947, Serial No. 754,885

4 Claims. (Cl. 219—10)

The present invention dates to seals for metal tubing and more particularly to improvements in the process and article by which the tubing is hermetically closed shut against fluid or air pressures from within or without. Tubing which must be sealed against the atmosphere finds use in many applications in which it is usually attached to a receptacle which has either been evacuated or contains gas or other fluid under pressures higher than the atmosphere. For example, thermostatic valves for refrigerators employ a Sylphon member containing a material which changes in volume when the temperature is changed. This change in volume is accommodated by the extensibility of the receptacle so that when the ambient temperature is reduced for example, the walls of the receptacle may lengthen to operate a valve in the path of the refrigerant, or may serve to cut out the refrigerator motor. Thermostatic actuators are used in many other ways and contain all kinds of fluids, liquid or gas, the fluids being maintained sometimes at greater and sometimes at less than atmospheric pressure.

The chief problem in the manufacture of these Sylphon elements is to provide a satisfactory way of sealing the element off after the contents have either been applied to or removed from the element. It has been customary heretofore to either melt the metal by welding torch while the tube is being collapsed, or else to pinch off the end of the tube and dip the same in solder. In either case, considerable hand operation is necessary which adds greatly to the cost of making a seal.

The primary object of the invention is to provide an improved method of sealing metal tubing having specific low resistance and preferably on conventional welding machines, to form a strong and durable hermetic joint.

Another object is to provide a sealing tube accessory for devices which rely for their operation on contained fluids either at a pressure higher or less than that of the atmosphere, said accessory having a welded hermetic joint in which the metal of the tube has relatively high specific conductivity and constitutes the sealing medium.

The above objects are carried out in brief by providing an additional layer of metal adjacent the tubing, having higher specific electric resistance than that of the tubing so that heat will be generated in the layer and conducted to the tubing in sufficient magnitude to cause the metal of the tubing to fuse and effect a hermetic seal.

The invention will be better understood when reference is made to the following description and accompanying drawing in which:

Fig. 1 represents a Sylphon device which may be used as a temperature responsive element and from which it is desired to evacuate the interior or to supply thereto a fluid under high pressure.

Fig. 2 represents an elevational view of a C-type welding gun which may be used in effecting the improved seal on a metal tubing having a relatively high specific conductivity.

Fig. 3 is an enlarged fragmentary view of the welding jaws, but with the metal tubing in section to show the start of the collapsing and sealing operation.

Fig. 4 indicates the shape that the metal tubing takes when compressed between the jaws of the welder and the seal has been completed.

Fig. 5 is a view similar to Fig. 3 but showing a modified method of effecting the seal, while Fig. 6 shows the manner in which the completed modified seal has been made.

Referring to Fig. 1, reference character 1 designates a Sylphon bellows element closed at both ends except for a metal tubing 2 which is secured by solder or otherwise to one wall of the element. At the closed end of the bellows there is a strengthening washer 3, carrying a rod 4, which may lead to a valve or other control device. The Sylphon material is relatively thin, and the corrugations allow the device to be elongated or contracted in accordance with the nature of the fluid within the element and the response of the fluid to the ambient temperature. In order to adapt the bellows to its valve-actuating function, it may be necessary to evacuate the bellows through the tubing 2 or to force within the bellows a desired fluid or substance under pressure. When this operation has been completed, it becomes necessary to seal off the tubing 2 as indicated at 5, while the evacuating pump or the pressure-applying apparatus is still connected to the tubing. For this purpose, the latter is given an extra length and at an intermediate position the opposite sides of the tubing are collapsed or compressed, at the same time welded shut. The excess length of the tubing can then be snipped off.

Considerable difficulty has been encountered heretofore in welding the tubing at the compressed portion, particularly in case the tubing is made of copper, for non-rust purposes, but which has a high electric conductivity. It seems that there is not enough specific resistance in the material to produce a welding heat when currents are passed therethrough from the electrodes of the welder. A machine of the last mentioned type is shown in Fig. 2. In this figure a C-shaped yoke 6 is supported from a pedestal (not shown) by an arm 17. The upper leg of the yoke may carry any kind of device, air or hydraulically operated, for reciprocating the upper electrode 8 in a bearing formed in the annular member 9. The energy for operating the device 7 may be transmitted through a pipe 10, as is well known in the art. Directly below the electrode 8 and extending vertically, there is a lower electrode 11, which is affixed in any suitable manner to the lower leg of the yoke 6. Electrical energy of relatively low voltage, but of considerable amplitude is supplied to the electrodes 8, 11 by means of wires 18.

In practice, the element is usually held in the hand of the operator and the tubing 2 is caused to rest on the lower electrode 11. At the same time, this tubing is connected, usually through flexible rubber pipe or tubing, to the evacuating pump or to suitable apparatus for injecting any desired material, fluid or liquid, under pressure into the interior of the element. The operator, by means of a foot-operated switch causes the pressure device 7 to push the electrode 8 downwardly until it meets the upper side of the tubing 2. At the same moment electricity, supplied through the wires 18, passes across the tubing in a restricted zone at the point where pressure is applied. In the event that the tubing is constituted of copper or other electrically conducting metal, a virtual short circuit is obtained between the electrodes 8, 11, and very little energy is transferred into heat at the tubing because the $I^2R$ loss is relatively low. Consequently, when further pressure is applied by the motor or pressure head 7, and the tubing is collapsed, it is difficult to obtain a hermetic weld at the compressed portion.

However, in accordance with my invention, I apply a metal tubing or ferrule 12 to the outside of the tubing 2 to assist in generating sufficient heat to cause the metal to melt. The ferrule 12 preferably has a specific resistance much greater than that of the tubing 2 and in case the latter is constituted of copper, the ferrule can advantageously be made of soft iron. It will be noted that the ferrule has a snug but slidable fit with respect to the tubing 2 and may be slid over the tubing by the operator just before the tubing is connected with the evacuating pump or the source of material under pressure. If desired, the ferrule 12 may be split longitudinally and applied to the tubing by temporarily holding the edges of the ferrule open so as to pass over the tubing just before the sealing weld is to be made. The advantage of this ferrule is shown in Fig. 4 in which the upper electrode 8 has been caused by the operator to be pressed downwardly against the lower stationary electrode 11 and at the same time current from the conductors 18 is caused to flow across opposite sides of the combined tubing and ferrule. This current produces a relatively high $I^2R$ loss in the ferrule on account of its high specific resistance and the heat generated within the ferrule is transferred by contact to the tubing so that the joint indicated at 13 where the tubing is compressed together is constituted of metal in a melted condition. This metal is preferably derived from the tubing, which in the case of copper, has a lower melting point than that of the ferrule.

It is obvious that instead of applying the ferrule 12 to the outside of the tubing 2 I may insert a ferrule inside of the tubing since it will receive the same amount of current from the electrodes 8, 11 in this position, as it would on the outside of the tubing and accordingly would generate the same amount of heat. However, in this case the seal would have to be formed of the metal of the ferrule at the position of the tubing collapse. Various other ways will occur to those skilled in the art for increasing the resistance of the tubing to such an extent as to increase the heat loss sufficient to provide a melting operation between the electrodes. For example, certain non-rusting alloys, such as an alloy of German silver and copper may be used for the tubing in which case the resistance of the element would be sufficient to provide the necessary heating effects.

In Fig. 5 I have shown a modified apparatus and method for producing a strictly hermetic seal in a piece of copper tubing that may be connected to the Sylphon 1. In this case, a small piece of solder rod 14 may be placed within the tubing before connection is made to the evacuating pump or the pressure-producing machine. This rod may contain a core of flux 15 as is well known in the art. When the electrode 8 is caused to move downwardly under the control of the operator as explained hereinbefore, the tubing 2 is collapsed by the electrodes. The specific resistance of the solder stick and contained flux is such that the electric current passing between the electrodes would generate sufficient heat within the solder to cause it to melt as indicated at 16 and form an effective seal.

After the seals 13 (Fig. 4) and 16 (Fig. 6) have been made in the manner described, the excess length of tubing and ferrule can be severed, because in one case the end of the tubing is closed by the metal thereof and in the other case is closed by solder.

While I have disclosed various ways and structure in which bodies of metal of relatively high specific resistance can be combined with copper tubing in order to facilitate the making of a seal, it will be understood that my invention is not limited to these specific features but contemplates any and all ways and structures by which sufficient heat can be evolved electrically at the point of seal in a copper tubing to simultaneously collapse the tubing and to form a hermetic seal.

Having thus fully described my invention what I claim as new and desire to secure by Letters Patent is:

1. A sealing tube adapted to withstand above and below atmospheric pressure, said tube having a circular portion, and a portion which is adapted to be collapsed to form a hermetically tight seal, a sleeve of closed perimeter fitting closely over both portions of the tube, the tube and sleeve being constituted of metals of different specific electrical conductivities and melting points such that when the collapsible portion is subjected to combined electrical heating currents and pressure and pressed to a flattened state the abutting surfaces of the tube are fused together by the heat developed in the sleeve, but the collapsed portion of the sleeve remains in an unmelted state and completely contains all parts of the tube at the welded position.

2. A sealing tube adapted to withstand above and below atmospheric pressures, said tube having a circular portion and a hermetically tight collapsed portion, said tube being constituted of metal of relatively good specific electrical conductivity, and a sleeve of closed perimeter fitting closely over the tube and its collapsed portion, said sleeve being constituted of a metal of less specific electrical conductivity than the tube, and the abutting surfaces of the collapsed portion of the tube being fused together by heat generated in said sleeve and contained completely within the sleeve at the weld position.

3. A copper sealing tube adapted to withstand above and below atmospheric pressure, said tube having a circular portion and a hermetically tight collapsed portion, a sleeve of closed perimeter and constituted of a metal of less specific electrical conductivity, but having a higher melting point than copper, fitted closely over the tube and its collapsed portion, the abutting surfaces of the copper tube at the collapsed position being integrally fused together by heat transmitted from the sleeve when welding currents are applied thereto and contained completely within the sleeve at the weld position.

4. A sealing tube adapted to withstand above and below atmospheric pressure, said tube having a circular portion, and a portion which is adapted to be collapsed and shut hermetically tight when heated to a fusing temperature, said portions normally being open-ended, a circular sleeve of a metal of less specific electrical conductivity than the tube fitted closely over the collapsible portion of the tube, said sleeve being adapted to receive electrical currents in an amount to generate sufficient heat which when communicated to the tube raises the temperature thereof to a fusing condition and causes the innermost abutting surfaces of the collapsed portion to become integrally united.

WILLIAM F. GRIMES.

REFERENCES CITED

The following references are of record in the file of this patent:

UNITED STATES PATENTS

| Number | Name | Date |
| --- | --- | --- |
| 1,266,831 | Layne | May 21, 1918 |
| 1,568,080 | Meadowcroft | Jan. 5, 1926 |
| 1,679,701 | Wysong | Aug. 7, 1928 |
| 1,750,643 | Murray et al. | Mar. 18, 1930 |
| 2,216,833 | Barry | Oct. 8, 1940 |
| 2,301,899 | McBain | Nov. 10, 1942 |
| 2,386,747 | Ris | Oct. 16, 1945 |

FOREIGN PATENTS

| Number | Country | Date |
| --- | --- | --- |
| 404,923 | Germany | Nov. 1, 1924 |
| 490,586 | Great Britain | Aug. 17, 1938 |